Oct. 16, 1945.    W. T. TOWNSEND    2,387,196
BED FOR INFANTS
Filed Jan. 25, 1944    3 Sheets-Sheet 1

Inventor
WILBUR T. TOWNSEND

By *Clarence A. O'Brien
and Harvey B. Jacobson*
Attorneys.

Oct. 16, 1945.  W. T. TOWNSEND  2,387,196
BED FOR INFANTS
Filed Jan. 25, 1944  3 Sheets-Sheet 2
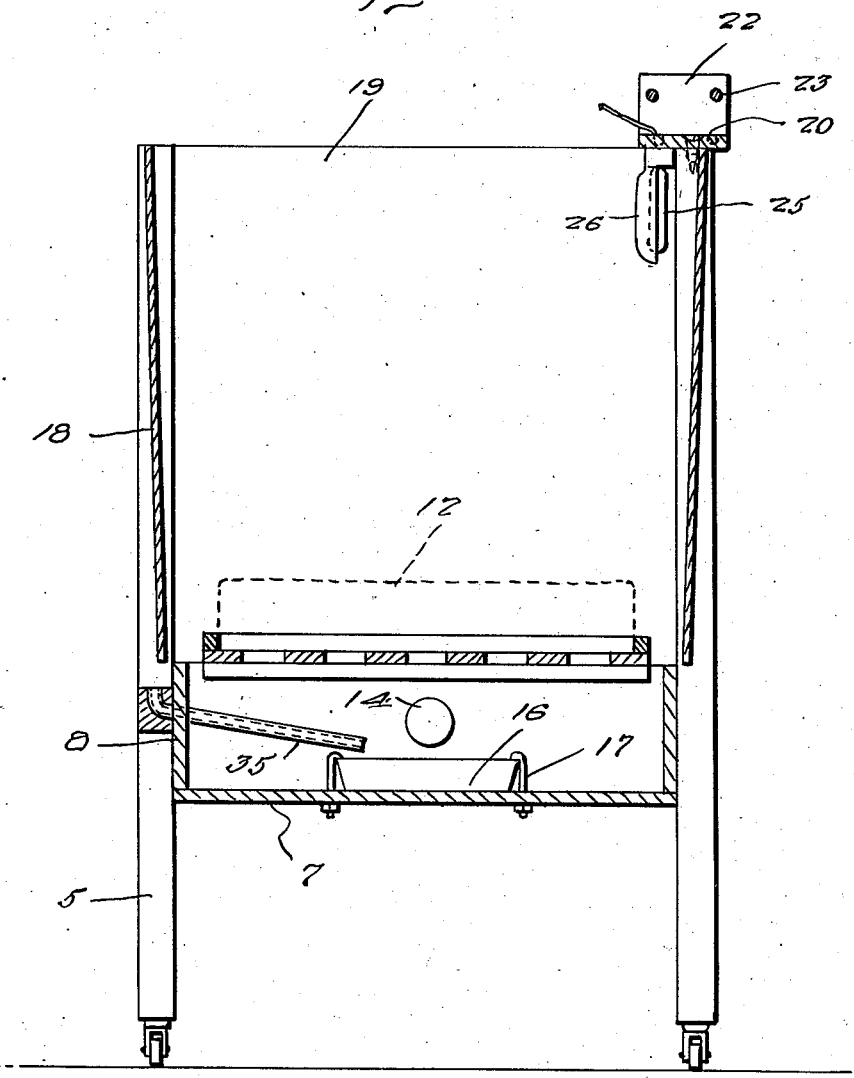
Inventor
WILBUR T. TOWNSEND Oct. 16, 1945.  W. T. TOWNSEND  2,387,196
BED FOR INFANTS
Filed Jan. 25, 1944  3 Sheets-Sheet 3
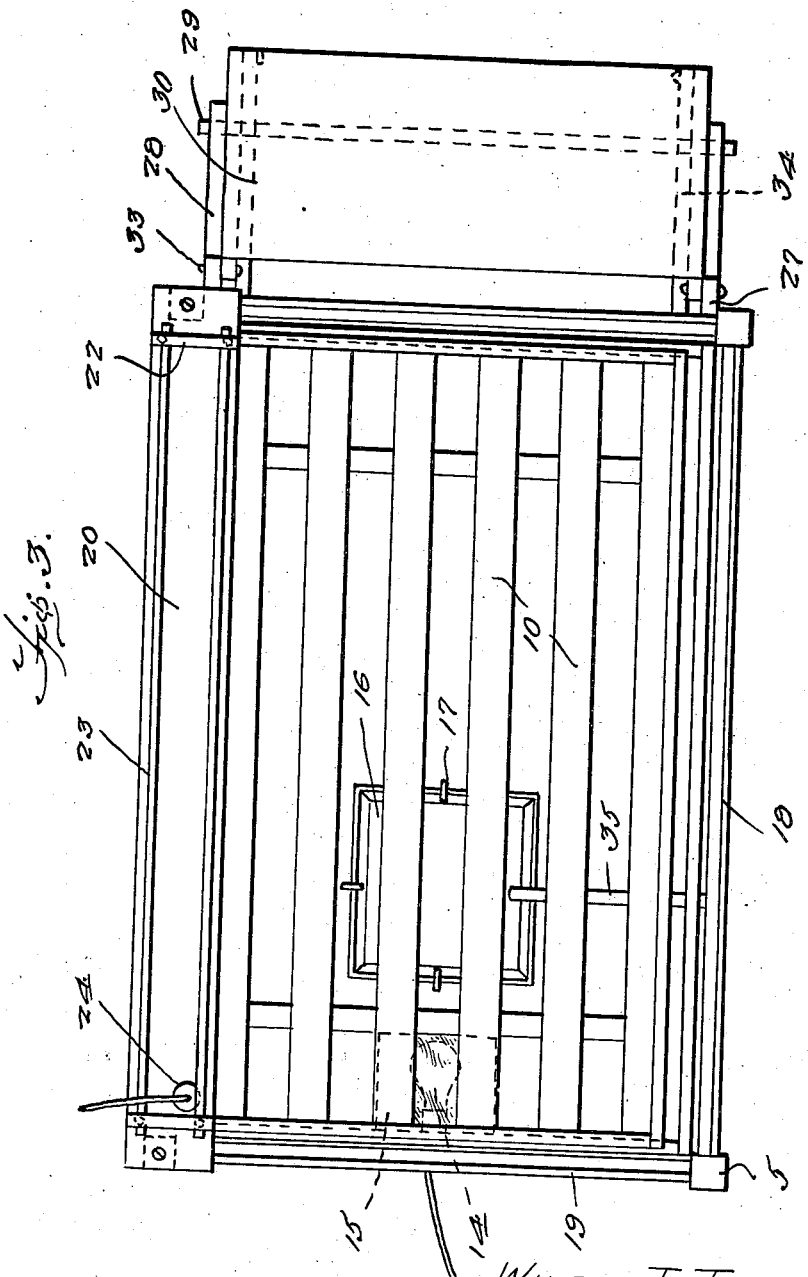
Inventor
WILBUR T. TOWNSEND
By *Clarence A. O'Brien
and Harvey B. Jacobson*
Attorneys Patented Oct. 16, 1945

2,387,196

UNITED STATES PATENT OFFICE 2,387,196

BED FOR INFANTS

Wilbur T. Townsend, Washington, D. C.

Application January 25, 1944, Serial No. 519,625

4 Claims. (Cl. 5—93)

The present invention relates to new and useful improvements in beds for infants and more particularly to provide a bed structure for premature or feeble infants and the invention has for its primary object to provide means for shielding the infant from direct contact from the injurious effects of air draughts and at the same time to provide means for supplying fresh air at all sides of the bed.

A further object of the invention is to provide means for heating the interior of the bed as well as to humidify the heated air and otherwise to control the air to which the infant is subjected.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a transverse sectional view, and

Figure 3 is a top plan view.

Figure 1:
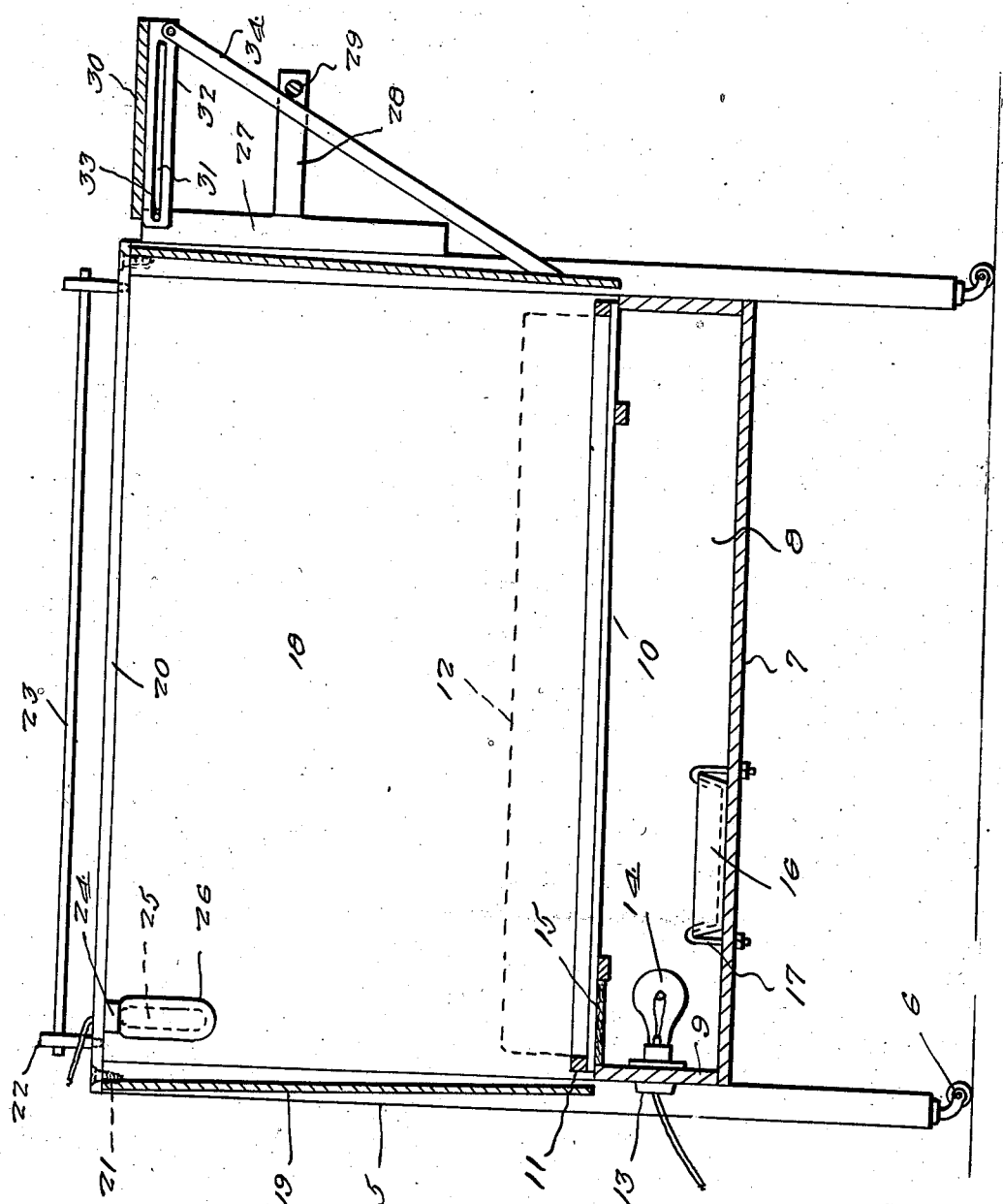
Figure 1 is a longitudinal sectional view.

Referring now to the drawings in detail wherein for the purpose of illustration I have disclosed a preferred embodiment of the invention the numeral 5 designates the four corner posts of the bed, and which preferably are made of wood and supported on the casters 6 for conveniently moving the bed to a desired position.

An imperforate bottom 7 is secured to the post and on which are supported upstanding side walls 8 and end walls 9 on the upper edges of which are supported the ends of a flat bed frame 10.

Shallow rails 11 extend around the marginal edges of the frame 10 and within which is positioned a mattress 12.

In one of the end walls 9 is positioned a lamp socket 13 in which is mounted an electric lamp 14 disposed under one end of the mattress 12. To the underside of the frame 10 immediately above the lamp 14 is secured an asbestos pad 15 to protect the mattress from direct effects of the heat from the lamp.

Supported on the bottom 7 is a pan 16 adapted to contain water, the edges of the pan being secured in position by clamps 17 which extend through the bottom 7.

To the upper portion of the legs 5 are secured the imperforate side walls 18 and end walls 19, the walls being inclined outwardly in an upward direction and the bottom edges of the walls 18 and 19 are offset from the vertical plane of the respective walls 8 and 9 and the lower edges of the walls 18 and 19 terminate substantially in the horizontal plane of the upper edges of the walls 8 and 9 as will be apparent from an inspection of Figures 1 and 2 of the drawings. The walls 18 and 19 are spaced slightly outwardly from the walls 8 and 9 to provide an air space between the walls of the lower compartment formed by the walls 8 and 9 and between the upper compartment formed by the walls 18 and 19.

The ends and sides of the frame 10 are likewise spaced from the walls 18 and 19 to permit upward circulation of air at all sides of the mattress 12.

Supported on one of the side walls 18 is a shelf 20 having screws 21 inserted in the posts 5 to support the shelf in position and rising from the shelf 20 adjacent the ends thereof are end plates 22 in which are supported rails 23 to maintain bottles and various articles in position on the shelf.

Also positioned in the shelf 20 is a lamp socket 24 in which an electric lamp 25 is mounted having a shield 26 to prevent glare of the lamp from shining in the eyes of the infant on the mattress 12.

Secured to the posts 5 at one end of the upper compartment is a pair of spaced apart vertical strips 27 from which project bracket arms 28 supporting a roller 29 at their outer ends and upon which paper or cloth toweling may be mounted. A shelf 30 is provided with slots 31 in its side rails 32 for receiving pins 33 on the upper ends of the strips 27 to permit swinging of the shelf upwardly and sliding the same downwardly against the end wall 19 into a folded position. Braces 34 are pivoted at their upper ends to the outer edge of the shelf 30 with their intermediate portions resting against the inside of the roller 29 and the lower ends of the braces resting loosely against the end wall to swing inwardly against the shelf when the latter is folded.

A feed tube 35 extends through one of the side walls 18 and terminates over the pan 16 to replenish the water therein, when desired. As shown to better advantage in Figure 2 the inner end portion of said tube inclines to the desired degree to facilitate the gravitation of the water into the pan. The outer end of the tube is upturned and embedded and otherwise protected in a surrounding block of wood or equivalent material whereby to minimize damage and likelihood of breakage.

The manner and use and many advantages of the crib will be apparent and may be briefly stated as providing a lower compartment in which air is heated and humidified for mixing with fresh air as it enters the ventilating passages at the bottom of the upper compartment or enclosure for circulation upwardly at all sides of the mattress. The side and end walls of the upper compartment protect the infant from direct air draughts which usually sweep across an open crib.

It is believed that the details of construction and manner of use of the device will be readily understood from the foregoing without further detailed explanation.

Having described the invention, what is claimed as new is:

1. An infant's bed comprising a lower compartment having imperforate walls, a reticulated frame resting on top of the walls to partially close the lower compartment, means for heating the air in the lower compartment, and an upper enclosure having imperforate walls rising above the lower compartment and offset outwardly from the walls of the lower compartment to provide an air passage at the lower edges of said upper enclosure, at least one edge of the frame being spaced inwardly of an adjacent wall of the lower compartment to admit heated air from the lower compartment to the upper enclosure for mixing with air entering the upper enclosure through the air passage.

2. An infant's bed comprising a lower compartment and an upper enclosure, said compartment and enclosure having imperforate walls, the walls of the upper enclosure being offset outwardly from the walls of the lower compartment to provide an air passage at the lower edges of the upper enclosure, means for supporting a mattress on the upper edges of the lower compartment to partially close the lower compartment, means for heating air in the lower compartment, at least one edge of the mattress being spaced inwardly from an adjacent wall of the lower compartment to admit heated air from the lower compartment into the upper enclosure for mixing with air entering the upper enclosure through the air passage and means for humidifying the heated air in said lower compartment.

3. An infant's bed comprising a lower compartment and an upper enclosure, said compartment and enclosure having imperforate walls, the walls of the upper enclosure being offset outwardly from the walls of the lower compartment to provide an air passage at the lower edges of the upper enclosure, means for supporting a mattress on the upper edges of the lower compartment to partially close the lower compartment, means for heating air in the lower compartment, at least one edge of the mattress being spaced inwardly from an adjacent wall of the lower compartment to admit heated air from the lower compartment into the upper enclosure for mixing with air entering the upper enclosure through the air passage, an open pan in the lower compartment adapted to contain a supply of water, and a feed tube extending through one of the walls of the lower compartment for supplying water to the pan.

4. In an infant's bed of the class described, an open top box-like compartment, air heating means in said compartment, heated air humidifying means in said compartment, means for supporting the compartment in an elevated position, a bed supported on the walls of the compartment with spaces to permit circulation of air therearound, and an enclosure supported on the upper portion of said supporting means and rising above the bed and including imperforate walls having their lower edges spaced outwardly from the walls of the compartment for admitting and mixing fresh air with the heated air from the heating means in the compartment for circulation and ventilation purposes up and around the perimeter portions of the bed.

WILBUR T. TOWNSEND.